United States Patent
Simonart et al.

(10) Patent No.: US 10,835,973 B2
(45) Date of Patent: Nov. 17, 2020

(54) SHAPED SAW WIRE WITH CONTROLLED CURVATURE AT BENDS

(71) Applicant: BEKAERT BINJIANG STEEL CORD CO., LTD., Jiangyin (CN)

(72) Inventors: Alain Simonart, Vichte (BE); Wenxian Huang, Jiangyin (CN)

(73) Assignee: BEKAERT BINJIANG STEEL CORD CO., LTD., Jiangyin (CN)

( * ) Notice: Subject to any disclaimer, the term of this patent is extended or adjusted under 35 U.S.C. 154(b) by 465 days.

(21) Appl. No.: 15/519,319

(22) PCT Filed: Sep. 23, 2015

(86) PCT No.: PCT/EP2015/071818
§ 371 (c)(1),
(2) Date: Apr. 14, 2017

(87) PCT Pub. No.: WO2016/066336
PCT Pub. Date: May 6, 2016

(65) Prior Publication Data
US 2017/0246697 A1    Aug. 31, 2017

(30) Foreign Application Priority Data

Oct. 31, 2014  (WO) ................ PCT/CN2014/089963

(51) Int. Cl.
*B23D 61/18* (2006.01)
*B28D 1/08* (2006.01)
(Continued)

(52) U.S. Cl.
CPC .......... *B23D 61/185* (2013.01); *B23D 65/00* (2013.01); *B28D 1/08* (2013.01); *B28D 5/04* (2013.01)

(58) Field of Classification Search
CPC ...... B23D 61/18; B23D 61/185; B23D 65/00; B28D 1/08; B28D 5/04; B28D 5/045; B28D 5/042
(Continued)

(56) References Cited

U.S. PATENT DOCUMENTS

| | | | | |
|---|---|---|---|---|
| 2009/0090344 A1* | 4/2009 | Vaubourg | ............. | B23D 61/185 125/18 |
| 2012/0216787 A1* | 8/2012 | Morita | ................. | B23K 35/262 125/21 |
| 2015/0158098 A1* | 6/2015 | Song | ..................... | B23D 65/00 125/21 |

FOREIGN PATENT DOCUMENTS

| | | |
|---|---|---|
| CN | 102205563 | 10/2011 |
| EP | 1 141 447 | 11/2003 |

(Continued)

OTHER PUBLICATIONS

International Search Report dated Jan. 7, 2016 in International (PCT) Application No. PCT/EP2015/071818.

*Primary Examiner* — Eileen P Morgan
*Assistant Examiner* — Marcel T Dion
(74) *Attorney, Agent, or Firm* — Wenderoth, Lind & Ponack, L.L.P.

(57) ABSTRACT

A saw wire to cut hard and brittle materials is disclosed that comprises a steel wire that is provided with bends with segments in between. The average degree of bending of the bends is between 0.5% and 5%. Such a saw wire has a higher breaking load compared to saw wires having a conventional, higher average degree of bending. A method to measure the curvature is described as well as a process to make the inventive saw wire. The invention is applicable to any shaped saw wire for example a single crimped saw wire, a
(Continued)

saw wire with at least two crimps in different planes, a saw wire with crimps rotating in a plane.

13 Claims, 6 Drawing Sheets

(51) Int. Cl.
*B28D 5/04* (2006.01)
*B23D 65/00* (2006.01)

(58) Field of Classification Search
USPC .......................................... 125/21
See application file for complete search history.

(56) References Cited

FOREIGN PATENT DOCUMENTS

| | | | |
|---|---|---|---|
| JP | 1-289527 | 11/1989 | |
| JP | 4-57666 | 2/1992 | |
| JP | 6-73674 | 3/1994 | |
| JP | 7-189148 | 7/1995 | |
| WO | 90/12670 | 11/1990 | |
| WO | 2006/067062 | 6/2006 | |
| WO | 2012/069314 | 5/2012 | |
| WO | WO-2014036714 A1 * | 3/2014 | ........... B23D 61/185 |
| WO | 2015/054820 | 4/2015 | |
| WO | 2015/119344 | 8/2015 | |

* cited by examiner

SHAPED SAW WIRE WITH CONTROLLED CURVATURE AT BENDS

TECHNICAL FIELD

The invention relates to a saw wire for sawing hard and brittle materials such as quartz, silicon, gallium arsenide, rare earth magnetic alloys and the like. The wire is suitable for loose abrasive sawing as well as fixed abrasive sawing.

BACKGROUND ART

From the beginning when multi-wire saws were first explored to saw hard and brittle materials, attempts have been made to improve the sawing performance of the wire. In a multi-wire saw, a single wire is arranged in multiple loops over a series of two to four capstans (making the name 'multi-wire saw' a misnomer in that only a single length of wire is present in the machine). The capstans are grooved to keep the wire loops in mutual parallel arrangement in a single plane called the wire web. Slurry comprising a liquid carrier (normally a viscous liquid like an oil or poly ethylene glycol (PEG)) wherein abrasive particles (usually silicon carbide dust) are dispersed is poured over the wire web while it is made to move in one way or in a reciprocating way by the capstans.

The role of the wire is to entrain, to drag the liquid carrier and the abrasive particles into the cut. The particles stick-and-roll between the workpiece and the wire thereby abrading the workpiece material away (three body abrasion). Mutatis mutandis also the wire material is abraded and the wire web must be constantly fed with fresh wire to replace the worn out wire.

The wire used as a saw wire is predominantly, if not exclusively, a round and straight, far drawn, high tensile, high carbon steel wire. Such wires can be made at very fine gauge such as 200 µm or 180 µm originally while now wires of 120 µm are standard. Inroads are being made to use wire of even finer gauge such as 110, 100 or even 90 to 80 µm. As the wire must be tensioned during sawing, the tensile strength must also increase accordingly. Tensile strengths of above 4000 N/mm$^2$ are now customary for 120 µm wires.

The surface of the fresh wire is very smooth and cylindrical which leads to depletion of the abrasive particles in the slurry interface layer between workpiece and wire as the wire progresses from entry to exit in the cut. While for short sawing lengths of less than say 200 mm this is not a problem, it becomes problematic for longer sawing lengths e.g. of more than 300 mm. An early idea was therefore to provide the saw wire with surface texture like for example pits, rigs, depressions or diameter variations (WO 90/12670) in order to improve the drag of the slurry into the cut.

An alternative, more realistic approach was to remain with a smooth and round wire but to deform the straight wire in a controlled way, to make it a 'shaped wire'. Examples are to deform the wire in a helix (JP4057666, 1992) or to induce a regular wave shaped crimp into the wire (JP1289527, 1989). In a further, currently popular, alternative the wire is crimped into a wave shape in two different planes that are substantially perpendicular to one another (WO2006/067062). Such double crimp somewhat alleviates the planar nature of the single crimp saw wire that may lead to a preferred orientation of the wire in the cut. But even a double crimp may lead to a preferred orientation as an equal deformation in both directions is difficult to achieve as demonstrated in WO 2012/069314. The solution to this orientation problem suggested in the latter publication is to deform the wire into a substantial helicoidal shape wherein straight sections alternate with outwardly oriented bends. A still other alternative to reduce the planar nature of the single crimped wire is to twist a single crimped wire around its axis (CN102205563A).

Although the crimping of steel filaments is generally known from the field of steel cord (see e.g. EP114147761, JP7189148A, JP6073674A) the degree of bending in crimps is invariably expressed in terms of a wavelength or pitch and an amplitude or height of the wave induced and this mostly expressed in relative terms to the diameter 'd' of the wire. However, such parameters do not allow adequate control of the actual bend that is induced on the wire.

Indeed, one of the most important properties of a saw wire, its breaking load, is seriously influenced by the crimping or bending of the wire. And as the use of the wire during sawing is a 100% quality control over the length of the wire, any weak link in the wire may result in a fracture and loss of time and material.

DISCLOSURE OF INVENTION

It is therefore the purpose of the invention to improve the existing types of shaped saw wires by imparting a controlled degree of local bending into the wire. A further object of the invention is to provide a method how this degree of bending can be controlled during production. It is another object of the invention to provide a measurement method to determine this degree of local bending.

Shaped saw wires are real life examples of what is known in differential geometry as space curves. Reference is made to standard textbooks on differential geometry or websites such as 'http://mathworld.wolfram.com'. The notation of the latter will be followed (see e.g. entry 'Curvature'). To enable the application of some geometrical principles of space curves on shaped saw wires, the centreline of the wire will be considered as representative of a space curve. The centreline is that line connecting the centre points of cross sections through the wire. The centre point is the geometrical average of the coordinates over the cross section.

The fundamental theorem of space curves states that any space curve can be reconstructed when the local curvature 'κ(s)' and local torsion 'τ(s)' are known along the length 's' along the curve. The curvature and torsion must be single valued continuous functions. The curve is unique except for the starting point and the starting orientation. Curvature and torsion describe how the angular rate of change of the curve varies along the curve length:

$$\kappa(s) = \frac{d\theta}{ds} = \frac{1}{\rho(s)} \qquad \{1\}$$

$$\tau(s) = \frac{d\alpha}{ds}$$

wherein 'θ' is the angle of the tangent vector to the curve 's' and 'α' is the angle of the osculating plane to the curve both at curve length 's' relative to any chosen but fixed reference frame. The osculating plane is the plane spanned by the tangent unit vector and normal unit vector to the curve.

The sign of the curvature 'κ(s)' is always positive, while that of the torsion 'τ(s)' is positive for a right handed curve and negative for a left handed curve. Sometimes it may be more convenient to express curvature by means of a 'radius of curvature ρ(s)' at the curve length 's'. This 'radius of curvature' is the radius of the osculating circle to the curve.

The 'osculating circle' is that circle in the osculating plane that is tangent to second order to the space curve.

According a first aspect of the invention a shaped saw wire is claimed for cutting hard and brittle materials. The saw wire comprises a steel wire. The steel wire is of a high carbon, high tensile type. Typically plain carbon steels are used. Possibly the steel wire is coated with a metallic coating such as a zinc or brass coating.

Generally the cross section of the steel wire can be polygonal, but preferably the wire has a circular cross section with diameter 'd'. The centreline follows the centres of the circular cross sections of the wire. The saw wire has bends with segments in between. A bend is that part of the wire, where the centreline deviates in direction substantially from the immediately adjacent sections. The bends can be numerated by the index 'i' that runs from 1 upward over a length that comprises at least 'N' bends, 'N' being not smaller than 50 i.e. at least 50 or more consecutive bends must be considered. 50 or more bends have been found to be a representative measure in order to obtain good statistics. Practically this comes down to a measuring length of at least 50 mm to at most 250 mm. The segments connect the bends to one another. Hence a point along the wire is either in a bend or in a segment but cannot be at the same time in a segment and a bend.

The rate of change in direction at the bend is quantified by the curvature along the curve length. At each of the bends the curvature '$\kappa(s)$' will reach a maximum that for bend with index 'i' will be called 'the top curvature $k_i$' (a Latin letter instead of a Greek letter is used to discriminate the practically measured value from the mathematical fiction of a curvature). Important to note is—as the measuring tension influences the shape of the wire—that the measuring tension applied on the saw wire during stretching remains limited. A value of about one newton has been found sufficient in order not to distort the shape of the wire.

In order to relate the degree of top curvature to the diameter of the steel wire 'd' the curvature is multiplied by half the diameter of the wire: '$k_i d/2$'. This quantity is dimensionless and will be called the degree of bending. Physically it is equal to the maximum permanent elongation that has been imposed at the outer fibre of the steel wire, outward of the bend. This number can also be expressed as a percentage. As the degree of curvature is very sensitive to the exact shape of the wire the regularity of the bends is best assessed through statistical means like an average and a standard deviation.

The inventors have found that by sampling over 50 or more bends (N≥50) an adequate precision is obtained. It is the inventors' experience that the average degree of bending on the fresh, unused wire is best between 0.5 to 5% or, if expressed in a mathematical formula, $$0.005 < \frac{\sum_{i=1}^{N} k_i d/2}{N} < 0.050 \quad \{2\}$$

When this 'average degree of bending' is imposed, best results are obtained in terms of breaking load retention and sawing performance.

Degrees of bending lower than 0.5% are no longer beneficial as the bends then are barely discernible from a straight wire. Such a saw wire loses its ability to drag slurry with abrasive into the cut.

When the average degree of bending is more than 5% the breaking load of the saw wire deteriorates to an extent that it is no longer usable as it tends to break much more in the sawing process. As for thicker wires, for example wire of diameters between 200 and 300 μm, the breaking load obtained is sufficiently high compared to the load applied during sawing some breaking load loss can be accepted. Therefore for this range of wire diameter an average degree of bending between 3% to 5% is tolerable.

For thinner gauge saw wires such as between 120 μm and 200 μm, large degrees of bending, above 3%, will lead to fracture issues during sawing. Therefore it is best that for this range of wire diameters the average degree of bending remains between 0.5% and 3% or even between 1.5% and 3%.

Finally for wires thinner or equal to 120 μm, the average degree of bending is best between 0.5 and 2% preferably must remain below 1.5% as otherwise the breaking load becomes too close to the tension during use of the saw wire.

In a further preferred feature of the inventive saw wire, the segments between the bends are substantially straight. With 'substantially straight' is meant that those segments have a radius of curvature that is nowhere in the segment smaller than 100×d. This corresponds to a degree of bending that is smaller than 0.5% over the curve length of the segment. So the lengths of wire that have a degree of bending that is below or equal to 0.5% are considered part of a segment, while the ones above 0.5% are part of a bend.

When measured over the total centre line length of the steel wire, the inventors found that it is best that the total length of the segments is lower than 85% of the total centre line length of the steel wire. If this percentage is higher, there are not enough bends in the wire to improve the slurry drag into the cut. On the other end if the total length of the segments is below 33% there is not enough section of wire that can wipe the abrasive against the inside of the cut and thereby improve the cutting. Best results of sawing are therefore obtained when the segment length is between 50% and 85% of the total length of the centreline of the steel wire.

Single bends with a degree of bending that is above 5% are particularly weak spots in the wire. Indeed, a high degree of bending of a single bend can ruin the performance of the wire. As this bend represents the weakest link, there is a high risk that the wire will break during sawing. Such bend should be avoided.

It is a particular challenge to make a saw wire wherein the degree of bending of single bends remains between boundaries. The inventors have found manufacturing methods to diminish the degree of variability in the bends. With these methods they were able to keep the standard deviation of the degree of bending over not less than 50 bends below 0.005 or 0.5%. In formula:

$$Std = \sqrt{\frac{\sum_{i=1}^{N}(k_i d/2 - Avg)^2}{N-1}} \quad \{3\}$$

Wherein $$Avg = \frac{\sum_{i=1}^{N} k_i d/2}{N} \quad \{4\}$$

Hence, preferably:

$$Std \leq 0.005 \qquad \{5\}$$

In a further preferred embodiment the number of bends over an axial length 'L' of 100×d is at least 10. With 'axial length 'L' is meant the straight length between the two fixation points of a saw wire sample that is held under a load of one newton. The axial length is always smaller than the curve length 'S' as the axis of the wire is straight and the centreline is not. When not enough bends are present, the slurry dragging will be insufficient.

If the number of bends exceeds 100 bends per 100×d the extra length in the wire becomes too high and the wire stretches during sawing. The 'extra length' is the difference between curve length of the centreline and axial length: 'S−L'. When expressed in a percentage '(S−L)/L', the 'extra length' should be larger than 0.06% but not larger than 0.6% of the axial length. More preferred is if the extra length percentage is between 0.06% and 0.3%. The stretching of the wire may lead to a non-planar wire web during sawing.

The wire can be formed in a number of preferred shapes. The invention of having a controlled average degree of bending is equally applicable to all of them as the performance of the wire is determined by the weakest links that are the bends. In the embodiments following all bends and/or segments are subject to the restrictions of the top curvatures as explained above.

According a first preferred shape, the wire has a helicoidal shape around an axis. Bends are induced into the wire such that the bends are oriented outwardly, away from the axis. The shape can be obtained starting from a helix wherein the smooth curve is intermittently bent outwardly. At each bend the degree of curvature will be a local maximum. In between the bends there are the segments.

In a second preferred embodiment, the saw wire is a steel wire provided with a crimp in the form of a wave. With a crimp is meant that subsequent bends are oppositely oriented (left, right, left, right . . . ). The shape of the wave can be expressed in terms of a wavelength and amplitude of the centreline, but these parameters do not suffice to extract the degree of curvature as will be shown later on.

The crimp can be in a single fixed plane resulting in a flat crimped saw wire.

Alternatively different crimps can be imposed on the steel wire in more than one plane. For example there can be a first wave crimp in a first plane and a second wave crimp in a second plane, the first plane being different from the second plane, but wherein the first and second planes cross one another along the axis of the saw wire. When looking to such saw wire parallel to the first plane, only the second crimp becomes visible and vice versa.

The advantage of this shape is that it allows more bends per unit axial length compared to only one single crimp plane. Also the saw wire becomes less prone to preferred orientation during sawing compared to a single plane crimp. The procedure can be readily extended to three, four or more planes thereby gradually increasing the number of bends per axial unit of length.

In a third preferred embodiment the wire is crimped in one or more planes, all crossing at the axis of the saw wire and the set of planes rotates along the axis of the saw wire as a whole as it progresses along the axial length. The rotation of the planes can be clockwise or counter clockwise. It can even alternate over a first length in a first rotation direction followed by a second length in the opposite rotation direction.

The saw wire may also be provided with an abrasive layer that is fixed on or to the surface of the steel wire. The abrasive layer comprises abrasive particles held in a bonding layer. The bonding layer can be a metal bond layer that is deposited electrolytically or by immersion in solder. Alternatively the bonding layer can be an organic bonding layer. The abrasive layer must be removed prior to the geometrical measurement of the saw wire.

According a second aspect of the invention a procedure is described on how the curvature of the saw wire can be determined.

To this end an axial scanning apparatus as described in WO 95/16816 is used. The apparatus comprises two axially aligned chucks, 100 to 500 mm apart, for holding the saw wire ends under test. A controlled tension is applied to the saw wire of 1±0.2 N for example by means of weight. A linear scanning apparatus such as a KEYENCE LS 3034 laser scan system in combination with a KEYENCE LS 3100 processing unit is made to travel parallel to the axis of the saw wire by means of an encoding high precision linear drive (accuracy is better than ±10 μm at a step size of 50 μm). The axis of the saw wire will be called the Z-axis. The measurement plane of the laser scan system is perpendicular to the Z-axis. The laser scan system can scan the outer edges of the wire up to a precision of ±0.5 μm.

In a first scan at the equidistant discrete measuring positions '$z_j$', '$\Delta z$' apart, the lower and upper edges of the wire are determined and the average of both is used as the position of the centreline along the axis perpendicular to the Z-axis, i.e. the X-axis. In this way the positions '$x(z_j)$' are measured and stored in a computer. The index 'j' is the sequential number of the sampled point and counts up to the number of measuring points 'M'.

Then the chucks are turned 90° and the scan is repeated. Now, the values '$y(z_j)$' along the Y-axis, perpendicular to X and Z-axis are measured and stored. In this way the triplets '$(x(z_j), y(z_j), z_j)$' are obtained that determine the shape of the centreline of the saw wire.

An alternative way to record $(x(z_j), y(z_j), z_j)$ is to have two, mutual perpendicular laser scan systems that record both $x(z_j)$ and $y(z_j)$ in one single pass. The procedures for analysing the data remain the same.

Mathematically, a space curve $\vec{\gamma}(t)$ expressed in a rectangular Cartesian coordinate system by means of parameter t (that is not necessarily the curve length s) can be defined as:

$$\vec{\gamma}(t) = x(t)\vec{e}_x + y(t)\vec{e}_y + z(t)\vec{e}_z \qquad \{6\}$$

one can then express the curvature κ(t) as $$\kappa(t) = \frac{|\vec{\gamma}' \times \vec{\gamma}''|}{|\vec{\gamma}'|^3} = \sqrt{\frac{(y'z'' - y''z')^2 + (x''z' - x'z'')^2 + (x'y'' - x''y')^2}{(x'^2 + y'^2 + z'^2)^3}} \qquad \{7\}$$

where dashed symbols represent derivatives to t.

As the saw wire is of general elongated shape and—when held between the chucks of the measuring apparatus—does not return on its path, the z coordinate can be used as a parameter for the curve. As then z=t, it follows that z'=1 and z''=0 thereby simplifying the above expression for the curvature to:

$$\kappa(z) = \sqrt{\frac{y''^2 + x''^2 + (x'y'' - x''y')^2}{(x'^2 + y'^2 + 1)^3}} \quad \{8\}$$

where dashed symbols now represent derivatives to z.

In order to perform a stable and accurate differentiation use has been made of the Savitzky-Golay procedure (See '*Smoothing and Differentiation of Data by Simplified Least Squares Procedures*' by Abraham Savitzky, M. J. E. Golay, Analytical chemistry, Vol 36, No 8 (1 Jul. 1964), pp 1627-1639).

In a nutshell this algorithm approximates the curve around a measured point '$x_j$' with a local polynomial of degree 'n' by means of a linear least square fit through 'm' points at either side of the point '$x_j$' i.e. in total '2m+1' points are involved:

$$X(z) = a_0 + a_1 q + a_2 q^2 + \ldots + a_n q^n = \Sigma_{k=0}^{n} a_k q^k = (1, q, q^2, \ldots, q^n) \cdot \vec{a} \quad \{9\}$$

Wherein $q = (z - z_j)/\Delta z$ and $\vec{a}$ is the coefficient vector (column). Hence in the neighborhood of $z_j$, q takes the 2m+1 values $-m, -m+1, -m+2 \ldots 0, 1, 2, \ldots m-1, m$.

The quantity to be minimized by the least squares method is:

$$\varepsilon = \Sigma_{i=-m}^{m}(X(z_{j+i}) - x_{j+i})^2 \quad \{10\}$$

wherein $x_{j+i} = x(z_{j+i})$, is the measured value along the X-axis at point 'j+i'.

If we then define the matrix {11}

$$J = \begin{bmatrix} 1 & -m & \ldots & (-m)^2 & (-m)^3 & \ldots & (-m)^n \\ 1 & -m+1 & (-m+1)^2 & (-m+1)^3 & \ldots & (-m+1)^n \\ \vdots & \vdots & \vdots & \vdots & & \vdots \\ 1 & 0 & 0 & 0 & \ldots & 0 \\ \vdots & \vdots & \vdots & \vdots & & \vdots \\ 1 & m-1 & (m-1)^2 & (m-1)^3 & \ldots & (m-1)^n \\ 1 & m & m^2 & m^3 & \ldots & m^n \end{bmatrix}$$

The solution coefficient vector can then be found to be (by solving the normal equations)

$$\vec{a}^{(j)} = (J^T \cdot J)^{-1} \cdot J^T \cdot \vec{x}^{(j)} \quad \{12\}$$

Wherein $\vec{x}^{(j)}$ is the column vector of the measured values:

$$(x_{j-m}; x_{j-m+1}; x_{j-m+2} \ldots x_j \ldots x_{j+m-2}; x_{j+m-1}; x_{j+m})_T \quad \{13\}$$

Note that the degree of the polynomial must be smaller or equal to the number of neighbouring points taken in the approximation i.e. '2m≥n' (The case '2m=n' is the degenerate case wherein '$\varepsilon = 0$' i.e. the polynomial goes through the measured points).

An estimate (indicated with a hat ^) for the point and the derivatives at the point with index j is then {14}:

$$\hat{x}_j = a_0^{(j)}; \hat{x}'_j = a_1^{(j)}/\Delta z; \hat{x}''_j = 2a_2^{(j)}/\Delta z^2 \text{ and } \hat{x}'''_j = 6a_3^{(j)}/\Delta z^3$$

By starting from point 'm+1' onward and gradually dropping the first point off and shifting the next point in, one can make an estimate for 'M-2m points. The same procedure is also performed for the $\vec{y}^{(j)}$ vector and again the derivatives can be estimated. Out of the estimated derivative values, the curvature can be calculated for each point (except the m endpoints at the start and end of the measuring sequence) by formula {8}.

Such procedures are available as subroutines in well-known software packages such as MatLab® (from Math-Works®), LabVIEW (from National Instruments®), GNU Octave and others.

In this way the curvature can be calculated at each measurement point (except the first and last 'm' datapoints) and the curvature '$k_j$' can be calculated at each index 'j'. Furthermore the curve length for each measurement point can be calculated as:

$$s_j \Sigma_{i=1}^{j} \sqrt{(x_l - x_{l-1})^2 + (y_l - y_{l-1})^2 + (z_l - z_{l-1})^2} \quad \{15\}$$

thereby linking the curve length along the centreline with the value of the curvature at point 'j'. In this way a curvature-length plot can be constructed.

According a third aspect of the invention, a method to produce the saw wire according the invention is disclosed. The method comprises the steps of:

Providing a steel wire of diameter 'd' with breaking load of '$F_m$' expressed in newton. The diameter can range from 50 μm to 300 μm. The breaking load of the steel wire may typically range between 30 to 250 N. The steel wire can be directly obtained from a wire drawing bench or it can be unwound from a spool in a wire winding apparatus.

The steel wire is dynamically led over one or more bending devices. The bending devices have a plurality of teeth. The top of the teeth are round with a teeth radius '$R_t$'. The wire is held under a tension 'T' also expressed in newton. This is the tension as measured after the steel wire has passed the one or more bending devices.

The inventors have found that in order to obtain the desired degree of curvature the teeth radius '$R_t$' must be larger than four times the diameter of the steel wire (4×d) and the tension must be in a range of 3 to 30% of '$F_m$'.

The term 'teeth' should not be interpreted only as being teeth on a gear type wheel. It could equally well be that the 'teeth' are implemented by means of pins that are arranged perpendicular to a disc at the outer circumference of the disc. The tooth radius '$R_t$' is then equal to half the diameter of the pin. Likewise the term 'toothed wheel' may refer to a disc with pins perpendicular at the circumference of the disc as well as a disc with teeth implemented at the rim of the disc i.e. a gear.

An even more preferred range of operation is wherein the tension is held between 7.5 to 20% of '$F_m$' while the teeth radius '$R_t$' is larger than or equal to four times (4×d) but smaller than (12.5×d) times the diameter of the steel wire. The tooth radius cannot become too large as then geometrical constraints on the distance between bends are imposed.

The bending device can be implemented in a number of ways. In a first preferred embodiment the wire is simply drawn over a single toothed wheel. The wire must span at least 3 teeth on the wheel. As this results in a bending that is always in the same direction, the wire will take a generally circular shape. Therefore this kind of bending is best combined with a rotation of the wire around its own axis. The resulting wire will show a generally helicoidal shape with the bends oriented outwardly of the axis of the wire.

Alternatively, the bending device can be one or more intermeshing toothed wheel pairs in between which the wire is led. Each pair of toothed wheels imposes a crimp to the steel wire. With 'crimp' is meant a repetitive zig-zag deformation along the length of the wire in a single plane. The crimp has a wavelength '$\lambda_1$' and amplitude. The circumferential distance between the teeth or pins corresponds to the wavelength imposed. Per wavelength there are two bends, hence the number of bends per unit length is '$2/\lambda_1$'. The wheels are adjusted such that the indentation of one tooth between the top of two facing teeth is set between 1 to 10 times the diameter 'd' of the steel wire. Even more preferred is when this is between 2 to 10 times, or 2 to 5 times the diameter of the steel wire. This indentation influences the amplitude of the crimp. However, as will be shown later on, the amplitude and wavelength have no influence on the value of the curvature at the bends. Curvature is a completely independent geometrical property.

In a further preferred embodiment, after the passage of a single toothed wheel pair, the single crimped wire can be led through a second toothed wheel pair. The second wheel pair preferably induces a crimp in a plane that is different from the first crimp plane, for example perpendicular to it. Preferably the second crimp has a wavelength '$\lambda_2$' different from the first wavelength '$\lambda_1$'. The second crimp further adds to the total number of bends per unit length. A good estimate is given by:

$$\frac{\text{Bends}}{\text{mm}} = 2(1/\lambda_1 + 1/\lambda_2 - 1/(\lambda_1\lambda_2)) \quad \{15\}$$

The procedure can be continued by putting a third, fourth etc. . . . pair of wheel pairs in series. A particularly convenient device for adjusting and imposing a crimp is described in the application PCT/CN2013/085200 of the current applicant.

In a further preferred embodiment, the bending device or devices can be made to rotate relative to the axis of the steel wire. This can either be achieved by rotating the device and prevent the steel wire of rotating, or by rotating the wire while it is guided through the stationary bending devices or by rotating both.

When two bending devices are used, the statistical distribution of top curvatures can become double peaked if the curvature induced by each of the bending devices is different.

In the following the invention will be further explained in detail by describing specific embodiments of the invention and by means of drawings.

BRIEF DESCRIPTION OF FIGURES IN THE DRAWINGS

FIG. 5b is an enlargement of a section of FIG. 5a.

MODE(S) FOR CARRYING OUT THE INVENTION

Figure 1A:
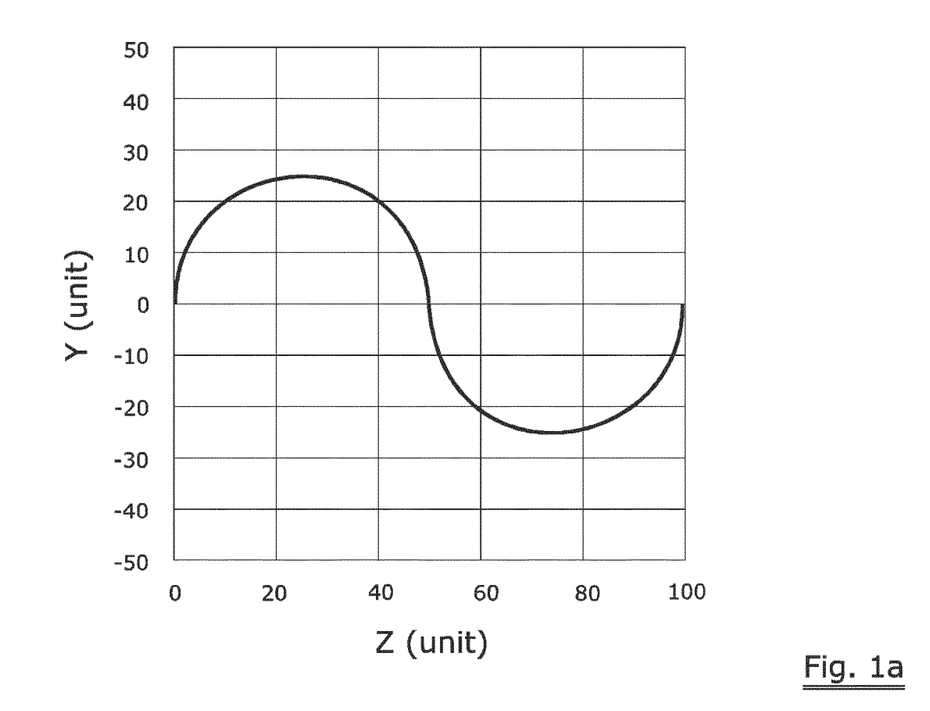
FIGS. 1a and 1b, 2a and 2b, 3a and 3b show different clarifications on curvature.
Figure 1B:
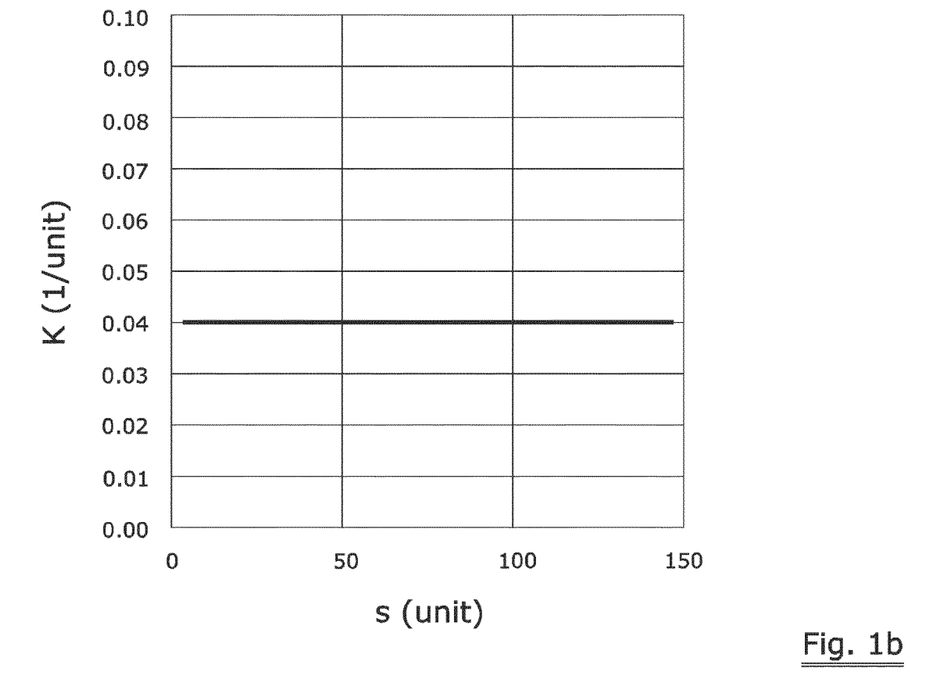
Figure 2A:
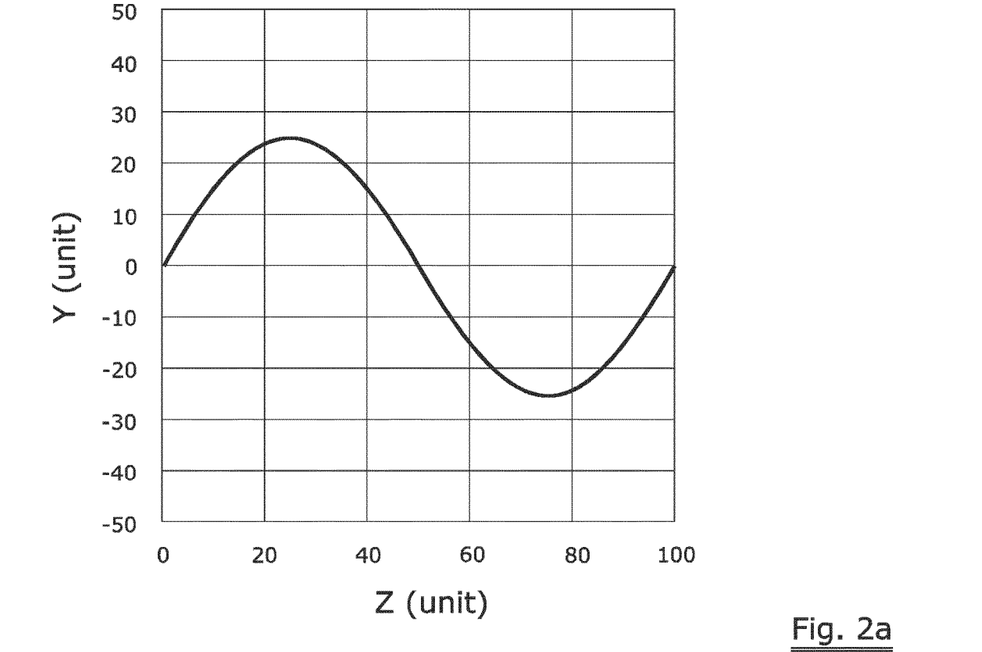
Figure 2B:
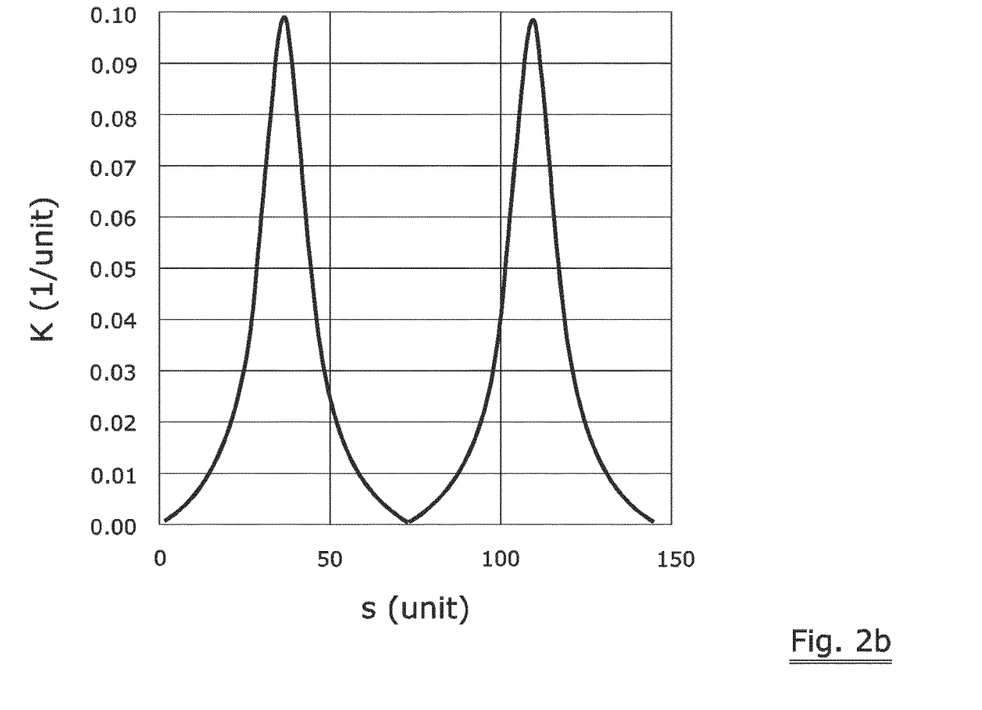
Figure 3A:
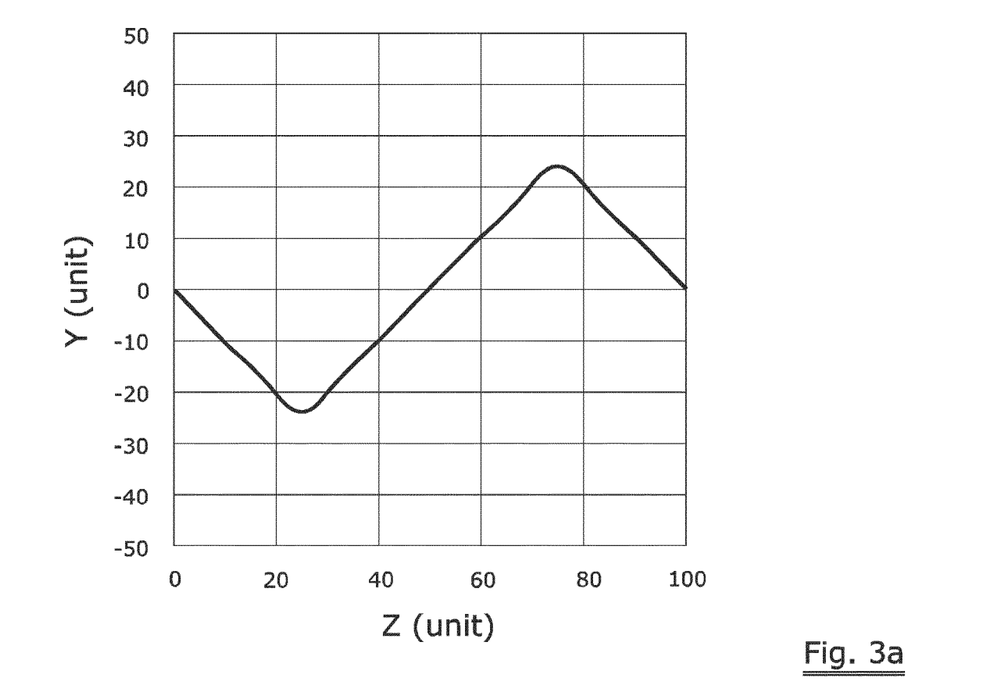
Figure 3B:
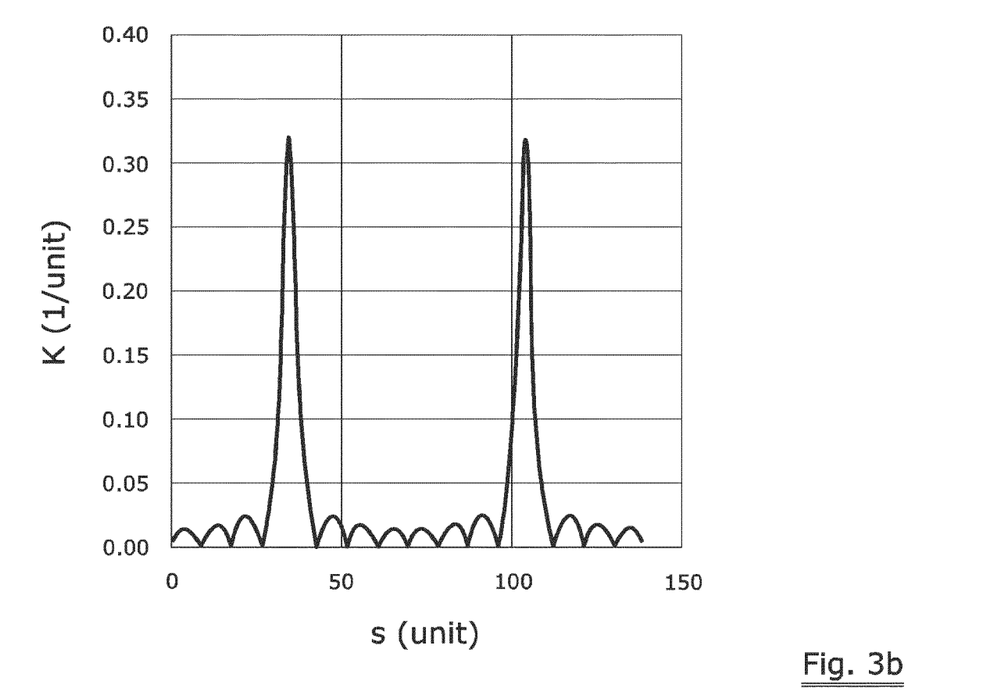

FIGS. 1, 2 and 3 show three plane wave forms in the Y-Z plane. They can be regarded as a 'unit cell representation' of a crimp of a saw wire. By repeating the unit cell a representation of the centreline of a saw wire with one plane crimp is obtained. All the three representations 1a, 2a, and 3a have the same wavelength, 100 units, and amplitude namely 25 units. An isometric scaling of the coordinates is intended (but can, due to reproduction of the graph, have been altered). The curvature as calculated from the curves is represented in FIGS. 1b, 2b, and 3b. They have been calculated by the numerical procedures as described above.

In FIG. 1a the crimp is in the form of two half-circles of radius 25 units that match at 50 units in Z direction. FIG. 1b shows the corresponding calculated curvature 'K' (in inverse units). In abscissa the curve length 's' along the curve is used. Note that the 's' length is longer than the wavelength of 100 units, because the length of the centreline is longer than the axial length. As the crimp is composed of half-circles with a radius of 25 units, the curvature remains constant at a value of $\frac{1}{25}$ or 0.04 inverse units.

FIG. 2a represents a crimp in the form of a sinus. Again the wavelength is 100 units and the amplitude is 25 units, as in the case of FIG. 1a. Now the curvature 'K' (in 1/units) shows a varying behaviour between 0 and 0.10 units$^{-1}$. At the points of inflection (at Z=0, 50 and 100 units) the curvature becomes zero as the second derivative y" at those points becomes zero. Note that for a single wavelength, two peaks occur.

FIG. 3a shows a saw tooth curve generated by summing a limited number of terms in the Fourier series of a saw tooth. The corresponding curvature plot is represented in FIG. 3b. Now the regions of high curvature are very much restricted to there where the tops and valleys of the curve occur (at Z=25 and 75 units). As the bends at the tops and valleys are shorter, the curvature 'K' rises to about 0.32 units$^{-1}$ at those positions. The lobes that are present between the peaks are a consequence of the limited number of terms taken in the series. As the curvature is composed of second order derivatives of the space curve it is very sensitive to tiny variations in direction of the curve.

Figure 4A:
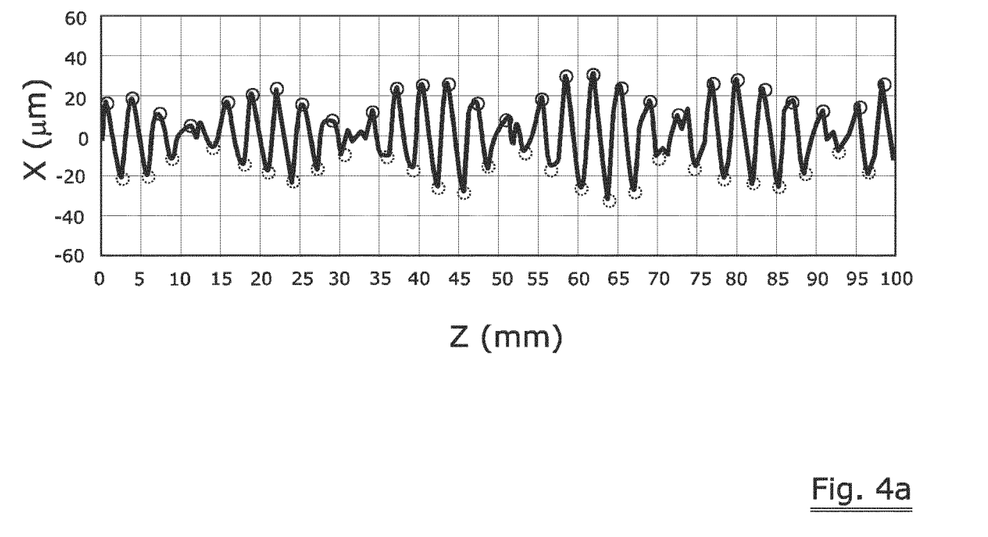
FIGS. 4a and 4b shows the centreline of the same piece of saw wire in the X-Z and Y-Z plane.
Figure 4B:
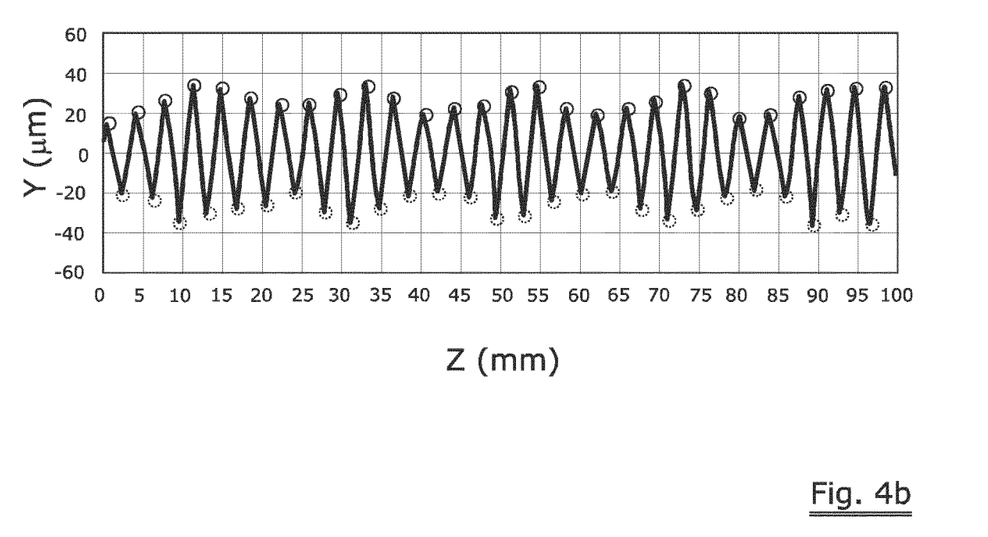

In FIGS. 4a and 4b a saw wire having bends with segments in between has been analysed with the apparatus as described in WO 95/16816 according the procedure of the second aspect of the invention. The steel wire has a diameter 'd' of 116 µm. The wire was clamped between the chucks without any twisting of the wire and then slightly tensioned (1N). The scan length is 100 mm in this case. FIG. 4a shows a screenshot of a computer screen that shows the Z and X coordinates as read in from the measuring apparatus. Thereafter the chucks were turned 90° and a second trace was recorded and is represented in FIG. 4b: the Y-Z plane. With these two traces, the position of the centreline is completely recorded in 3D space at the discrete points: $(x(z_j), y(z_j), z_j)$.

These discrete points can now be manipulated computationally. For example by mathematically rotating the wire around the Z-axis at an angle of 59° the centreline of the wire shows a single crimp in one plane with a wavelength of 3.62 mm and a peak-to-peak amplitude of 59 µm. When virtually turning the wire further, a single second crimp occurs in a plane at an angle of 148° with a wavelength of 3.06 mm and an amplitude of 31 µm. So the saw wire is of the type that comprises two different crimps in planes that are under an angle of 89° to one another and cross at the axis of the saw wire.

In the software package LabVIEW (from National Instruments®) the traces were numerically differentiated according the Savitsky-Golay procedure. This procedure is a readymade 'Virtual Instrument (*.vi)' available in the software package ('Savitzky-Golay Filter Coefficients.vi'). In this procedure the results of course depend on the degree 'n' of the polynomial used and the number of data points '2m+1' in each vector.

After due experimentation the inventors found the settings 'n=5' and 'm=9' (i.e. there are 19 datapoints in the vector {13}) as most appropriate for the analysis of a saw wire. The length taken into account is then 19×50 µm or 0.95 mm which is about 8 diameters of the metal wire. Saw wires should be analysed over a length of between 4 to 10 times their diameter. Increasing the number of samples point in the analysis interval will 'average out' all features of the space curve. Using less sample points increases the noise too much.

The degree of the polynomial used should at least be 4. This is because a space curve in the tripod tangent, normal and binormal can be locally expressed in a third order polynomial in the curve length 's'. Higher order terms remain for absorbing the error. Using a polynomial degree that is higher than 5 is not useful as only the first three derivatives are used in curvature and torsion formulas. The higher order terms allow a better fit, but are of no use as only the lower order terms appear in the derivation.

It is further noteworthy to mention that the curvature is completely independent of the orientation of the wire between the chucks: the clamping of the wire must not be exactly diametrical to one another in order to obtain reliable results. It is only when one deforms the wire by applying tension that the curvature results change due to the deformation of the wire.

By the Savitsky-Golay procedure numerical estimates were obtained for the first and second derivatives in X and Y as per formula {14} and subsequently used in the expression for the curvature {8}. In this way for every data point (except the first 9 and 9 last points) a curvature 'k' can be calculated. For each point also the curve length 's' can be calculated by using {15}. By now plotting the quantity 'kd/2' as a function of 's' the graph of FIG. 5a is obtained.

Figure 5A:
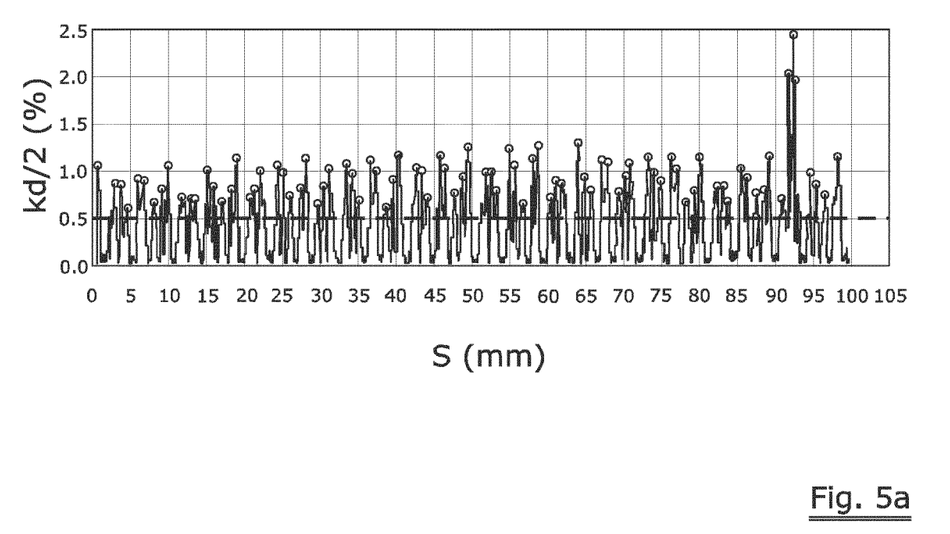
FIG. 5a shows the curvature as a function of curve length of the same piece of saw wire as in FIGS. 4a and 4b.

In FIG. 5a, the curve shows a sequence of peaks of which the top value corresponds with the maximum curvature determined at the bends. These are the 'top curvatures $k_t d/2$' as in the language of the claims and are indicated by a small circle. The dashed line corresponds to a curvature of 0.5% which i.e. a radius of curvature of '100×d'. Hence, the points under the line belong to segments, while the points that are on or above the line belong to bends.

Figure 5B:
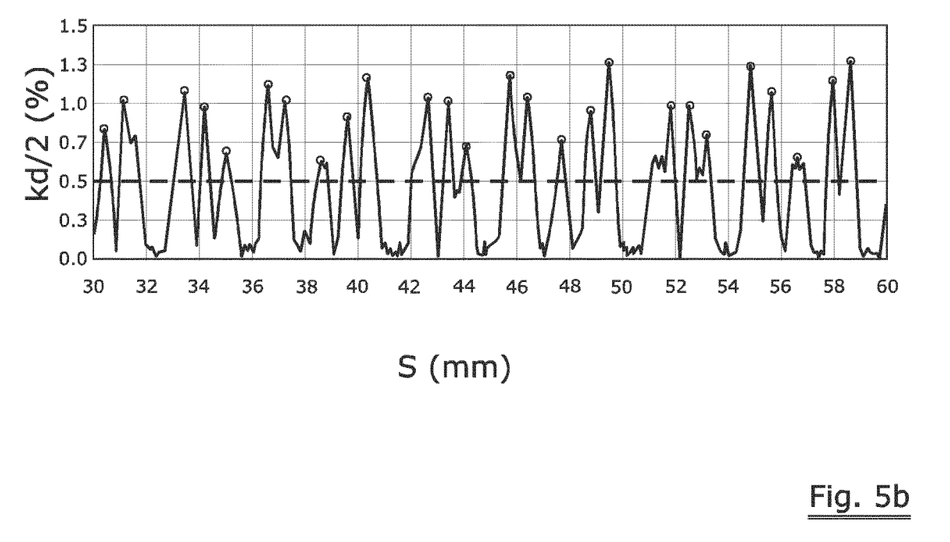

FIG. 5b, is an enlargement of FIG. 5a of the range 30 to 60 mm. It shows the peaks more clearly and also the straight segments can be readily extracted from the graph.

In a further module of LabVIEW, the top curvatures are detected and identified. Obviously only the peaks above the 0.5% threshold are identified. One can then easily extract the following statistics:
  87 peaks are present in the range from 0 to 100 mm i.e. 'N=87'
  Hence the number of peaks per mm is 0.87 and the number of peaks per 100×d is 10.092.
  The average of the 87 $k_t d/2$ top bending values is 0.95% and the standard deviation is 0.24%
  The maximum $k_t d/2$ value observed is 2.5% (at 's' equal to about 92 mm)

In a series of experiments a steel wire of diameter 115 µm with a tensile strength of 3650 N/mm² was deformed between a pair of toothed wheels thus forming a single crimp wire. The following parameters were varied:
  The tension 'T' on the wire during crimping;
  The teeth radius '$R_t$' by using different toothed wheels with 0.3 (2.6×d), 0.5 (4.35×d), 1 (8.70×d), 1.5 (13×d) mm teeth radius.
  The wavelength of the crimp: 1.8, 2.8, 3.1 and 3.7 mm.

The samples obtained where analysed geometrically as described above, as well as their mechanical properties determined and in particular the tensile strength. The results are depicted in FIG. 6.

Figure 6:
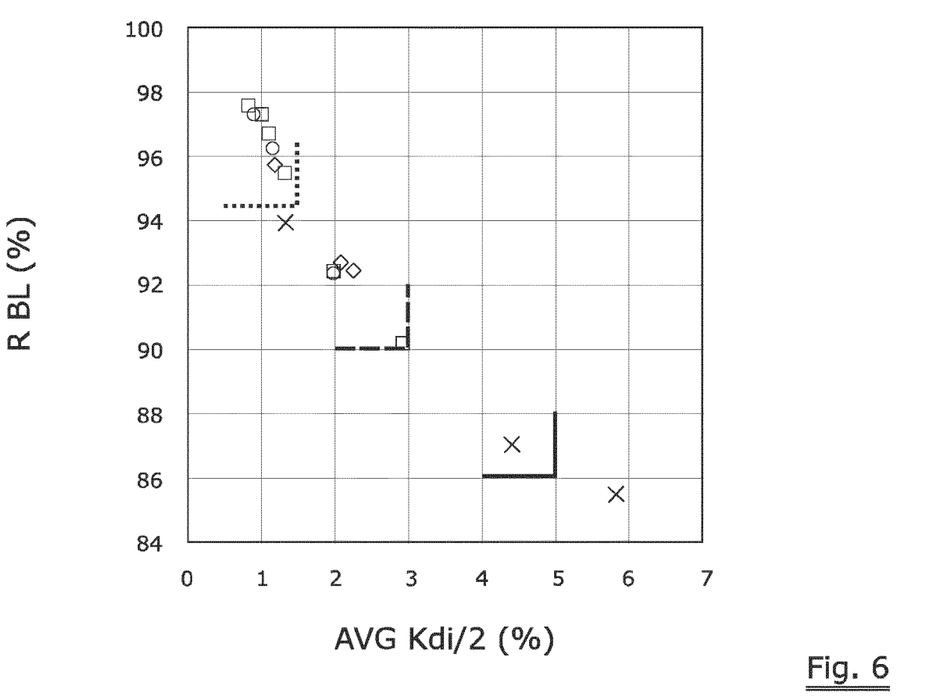
FIG. 6 shows the relationship between relative breaking load of the wire and average degree of bending.

In FIG. 6 the relative breaking load (in %, relative to the value of a straight, not crimped wire) as a function of the average measured degree of bending (in %) is depicted. The different symbols depict various combinations of the above parameters. It is clear that as the average bending degree goes over the 5% limit, a loss of more than 14% of tensile strength relative to the straight wire can be expected and this becomes too much for saw wire applications.

For saw wires with an average bending degree of between 3 and 5% a tensile strength loss of between 10 and 14% can be expected. For thicker saw wires in the range of 200 µm to 300 µm this is still acceptable. This is indicated by the solid line bracket in FIG. 6.

For wires with an average bending degree of between 1.5% and 3% a loss in tensile strength of between 5.5% and 10% is acceptable for wires of diameter 120 µm to 200 µm (the dashed bracket in FIG. 6).

Finally for wires with an average bending degree of between 0.5 and 1.5% the smallest loss in tensile strength of between 1.5 and 5.5% is expected and therefore most appropriate for wires smaller or equal to 120 µm. This is indicated by the dotted bracket in FIG. 6.

In a further series of experiments, the influence of the processing conditions was investigated. A straight steel wire with diameter 'd' of 120 µm was led through a first pair of deformation wheels of which the teeth have radii of 12.5 times 'd' and at different tension levels. The tension level is measured after passage through the bending apparatus. The indentation of the wheel was set to 2×d. Thereafter the average degree of bending was determined on the wires. In a second series of tests the same straight wire was deformed through a pair of wheels with teeth radii of 8.3×d, with the same different tension levels and the same degree of indentation.

Figure 7:
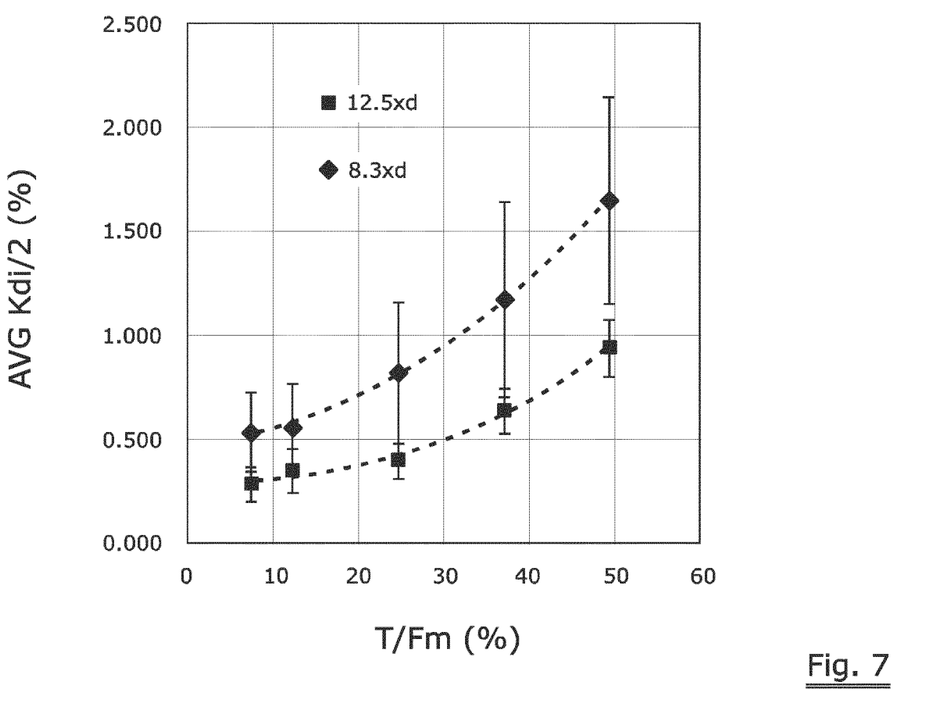
FIG. 7 illustrates the relation between the teeth radius of and the tension on the average bending degree.

The results are depicted in FIG. 7. There the different tension levels 'T' applied are expressed as fractions of the breaking load '$F_m$' in abscissa: 'T/Fm (in %)'. In ordinate the average degree of bending ('AVG kdi/2') is represented in percent in ordinate. When a higher tooth radius is used (12.5×d), a larger tension must be applied to obtain the desired minimum degree of bending. However, a large tooth radius has the advantage that the wire is not easily deformed too much and that the standard deviation remains low (as indicated by the one standard deviation error bars).

A tooth radius of '8.3×d' results in an average degree of bending within the preferred region of 0.50 to 1.50% for the smaller diameter of the steel wire. By preference the tension is held between 10 to 30% of the breaking load. However, the curvature shows a higher standard deviation.

The invention claimed is:

1. A saw wire for cutting hard and brittle materials comprising a steel wire with a diameter 'd' and a centreline, said saw wire having bends with segments in between, said centreline having a top curvature '$k_i$' at each of said bends when measured with a load of about one newton on said saw wire,
  wherein the average of the products of said top curvatures with half said diameter, over a length of saw wire comprising at least 'N' bends, with 'N' being not less than 50, is between 0.5 and 5 percent or in formula:

$$0.005 < \frac{\sum_{i=1}^{N} k_i d/2}{N} < 0.050$$

wherein said segments have a radius of curvature that is larger than 100×d, wherein the total length of said segments is higher than 33% of the total centre line length of said steel wire, wherein the total length of said segments is lower than 85% of the total centre line length of said steel wire, and wherein the number of bends is at least 10 over an axial length of 100 times the diameter 'd'.

2. The saw wire according to claim 1 wherein for said steel wire with diameter between 200 μm and 300 μm said average is between 3 to 5%.

3. The saw wire according to claim 1 wherein the maximum value of said products $k_i \times d/2$ does not exceed 0.05.

4. The saw wire according to claim 1 wherein the standard deviation of said products $k_i \times d/2$, over a length of saw wire comprising at least 50 bends is lower than 0.005.

5. The saw wire according to claim 1 wherein said saw wire has a helicoidal shape around an axis and wherein said bends are oriented radially outward of said axis.

6. The saw wire according to claim 1 wherein said saw wire comprises crimps in the form of a wave in at least one plane comprising the axis of said saw wire.

7. The saw wire according to claim 6 wherein a first wave crimp is in a first plane, a second wave crimp is in a second plane, said first plane being different from said second plane, said first and second plane crossing one another along the axis of said saw wire.

8. The saw wire according to claim 6 wherein said crimps in the form of a wave in at least one plane rotate around said axis along the axial length of said saw wire.

9. The saw wire according to claim 1 further comprising an abrasive layer fixed on the surface of said steel wire.

10. The saw wire according to claim 7 wherein said first plane and said second plane rotates around said axis along the axial length of said saw wire.

11. The saw wire according to claim 1 wherein for said steel wire with diameter between 120 μm and 200 μm said average is between 0.5% to 3%.

12. The saw wire according to claim 1 wherein for said steel wire with diameter thinner or equal to 120 μm said average is between 0.5% and 2%.

13. The saw wire according to claim 1 wherein an axial length 'L' is the straight length between two fixation points of the saw wire when held under a load of one newton, and a curve length 'S' is the length along the centreline of the wire over said axial length 'L' and wherein the extra length in the saw wire is the difference between the curve length and the axial length 'S–L', and wherein the extra length is larger than 0.06% of the axial length 'L' and not larger than 0.6% of the axial length 'L'.

* * * * *